United States Patent
Li

(10) Patent No.: US 9,984,662 B2
(45) Date of Patent: May 29, 2018

(54) VIRTUAL REALITY SYSTEM, AND METHOD AND APPARATUS FOR DISPLAYING AN ANDROID APPLICATION IMAGE THEREIN

(71) Applicant: Beijing Pico Technology Co., Ltd., Hai Dian District (CN)

(72) Inventor: Li gang Li, Hai Dian District (CN)

(73) Assignee: BEIJING PICO TECHNOLOGY CO., LTD., Hai Dian District (CN)

( * ) Notice: Subject to any disclaimer, the term of this patent is extended or adjusted under 35 U.S.C. 154(b) by 76 days.

(21) Appl. No.: 15/223,547

(22) Filed: Jul. 29, 2016

(65) Prior Publication Data

US 2017/0161952 A1    Jun. 8, 2017

(30) Foreign Application Priority Data

Dec. 3, 2015   (CN) .......................... 2015 1 0882687

(51) Int. Cl.
| | |
|---|---|
| *G09G 5/02* | (2006.01) |
| *G09G 5/377* | (2006.01) |
| *G06T 11/00* | (2006.01) |
| *G06T 1/00* | (2006.01) |
| *G06F 3/147* | (2006.01) |
| *G06F 3/00* | (2006.01) |

(52) U.S. Cl.
CPC ............... *G09G 5/377* (2013.01); *G06F 3/00* (2013.01); *G06F 3/147* (2013.01); *G06T 1/0007* (2013.01); *G06T 11/001* (2013.01); *G06T 2207/20221* (2013.01)

(58) Field of Classification Search
CPC .................................. G06F 3/00; G06F 17/248
See application file for complete search history.

(56) References Cited

U.S. PATENT DOCUMENTS

| | | | | |
|---|---|---|---|---|
| 2012/0235998 A1* | 9/2012 | Smith-Casem | ..... | G01S 7/52034 345/424 |
| 2016/0044139 A1* | 2/2016 | Lin | ..... | G06F 9/45558 709/203 |
| 2016/0092091 A1* | 3/2016 | Hanson | ..... | G06F 17/248 715/763 |

* cited by examiner

*Primary Examiner* — Weiming He
(74) *Attorney, Agent, or Firm* — LKGlobal/Lorenz & Kopf, LLP

(57) ABSTRACT

A method for displaying an Android application image in a virtual reality system includes, but is not limited to, acquiring screen contents to be displayed. The method further includes calling a SurfaceFlinger module responsible for display synthesis in an Android system, and determining display relations of the screen contents to be displayed. The method further includes sketching textures of the screen contents to be displayed according to the determined display relations by means of an OpenGL. The method further includes establishing a grid for a left-side screen and a right-side screen of the virtual reality system, respectively. The method further includes sketching the textures to respective grids of the left-side screen and the right-side screen for displaying. These solutions solve the problem that an ordinary Android application cannot be correctly displayed in the virtual reality system, and largely increase the number of Android applications usable in the virtual reality system.

7 Claims, 2 Drawing Sheets

VIRTUAL REALITY SYSTEM, AND METHOD AND APPARATUS FOR DISPLAYING AN ANDROID APPLICATION IMAGE THEREIN

CROSS-REFERENCE TO RELATED APPLICATIONS

This application claims priority to Chinese Application Number 201510882687.0 filed Dec. 3, 2015, which is incorporated herein by reference in its entirety.

TECHNICAL FIELD

The present invention relates to the field of virtual realities, and particularly, to a method and an apparatus for displaying an Android application image in a virtual reality system, and the virtual reality system.

BACKGROUND

The virtual reality system is a computer simulation system where a virtual world can be created and experienced, and provides a multi-source information fused interactive systematic simulation of 3D dynamic view and entity behaviors. It employs a computer to generate a simulation environment where the users are immersed. For example, a user may interact with the virtual reality system by wearing a virtual reality device such as a virtual reality helmet.

In recent years, the Android system gradually becomes the preferred operation system in various virtual reality systems due to the advantages of open sources and complete ecological environment. However, the left-eye picture and the right-eye picture of the virtual reality device are independent from each other, and two pictures are required simultaneously. While the existed Android applications are not specially developed and designed for the virtual reality device, and they have only one picture that cannot meet the user's requirement. As a result, the massive Android applications cannot be used in the virtual reality system, and there occurs a problem that the virtual reality system lacks applications and has a poor ecological environment.

In addition, other objects, desirable features and characteristics will become apparent from the subsequent summary and detailed description, and the appended claims, taken in conjunction with the accompanying drawings and this background.

SUMMARY

In view of the above problem, the present invention is proposed to provide a method and an apparatus for displaying an Android application image in a virtual reality system, and the virtual reality system, which can overcome or at least partially solve the above problem.

According to an aspect of the present invention, a method for displaying an Android application image in a virtual reality system is provided, comprising: acquiring screen contents to be displayed, including one or more Android application images and a user interface image of the virtual reality system; calling a SurfaceFlinger module responsible for display synthesis in an Android system, and determining display relations of images in the screen contents to be displayed; establishing a grid for a left-side screen and a right-side screen of the virtual reality system, respectively; and using an OpenGL to sketch textures of each image in the screen contents to be displayed to respective grids of the left-side screen and the right-side screen for displaying according to the display relations.

Optionally, after acquiring the screen contents to be displayed, the method further comprises: applying for corresponding layers for the one or more Android application images and the user interface image of the virtual reality system, respectively; and calling a SurfaceFlinger module responsible for display synthesis in an Android system, and determining display relations of the screen contents to be displayed comprises: determining display relations of the layers.

Optionally, using an OpenGL to sketch textures of each image in the screen contents to be displayed to respective grids of the left-side screen and the right-side screen of the virtual reality system for displaying according to the display relations comprises: merging the images in the screen contents to be displayed according to the determined display relations to sketch a complete image; and using the OpenGL to sketch textures of the complete image to the respective grids of the left-side screen and the right-side screen for displaying.

According to another aspect of the present invention, an apparatus for displaying an Android application image in a virtual reality system is provided, comprising: an acquiring unit configured to acquire screen contents to be displayed, including one or more Android application images and a user interface image of the virtual reality system; a display relation determining unit configured to call a SurfaceFlinger module responsible for display synthesis in an Android system, and determine display relations of images in the screen contents to be displayed; a grid establishing unit configured to establish a grid for a left-side screen and a right-side screen of the virtual reality system, respectively; and a sketching and displaying unit configured to use an OpenGL to sketch textures of each image in the screen contents to be displayed to respective grids of the left-side screen and the right-side screen for displaying according to the display relations.

Optionally, the apparatus further comprises: a layer applying unit configured to apply for corresponding layers for the one or more Android application images and the user interface image of the virtual reality system, respectively; and the display relation determining unit is further configured to determine display relations of the layers.

Optionally, the sketching and displaying unit is specifically configured to merge the images in the screen contents to be displayed according to the determined display relations to sketch a complete image; and use the OpenGL to sketch textures of the complete image to the respective grids of the left-side screen and the right-side screen for displaying.

According to still another aspect of the present invention, a virtual reality system is provided, comprising an apparatus for displaying an Android application image according to any one of the above items, in which one or more Android applications are run.

It can be seen that the technical solutions of the present invention determine the display relations such as superposition orders and orientations of one or more Android application images and the user interface image of the virtual reality system, by calling a SurfaceFlinger module responsible for display synthesis in an Android system, apply for corresponding layers for one or more Android application images and the user interface image of the virtual reality system, respectively, and establish a grid for a left-side screen and a right-side screen of the virtual reality system, respectively; next, they use an OpenGL to sketch textures of each image in the screen contents to be displayed to respective grids of the left-side screen and the right-side screen of the virtual reality system for displaying. The technical solutions solve the problem that an ordinary Android application having only one picture cannot be correctly displayed in the virtual reality system, and largely increase the number of Android applications usable in the virtual reality system. The cost is low, the method is simple, and the ecological environment of the virtual reality system is improved, thus the technical solutions are suitable for practical purposes.

The above descriptions just summarize the technical solutions of the present invention. Furthermore, in order to understand the technical means of the present invention more clearly so as to implement the present invention based on the content of the Description, and in order to enable the above and other objects, features and advantages of the present invention to be understood more obviously and easily, the embodiments of the present invention are specifically given as follows.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The exemplary embodiments of the present disclosure will be described more in more detail with reference to the drawings. Although the drawings illustrate the exemplary embodiments of the present disclosure, it shall be appreciated that the present disclosure can be implemented in various ways, rather than being restricted by the embodiments elaborated herein. On the contrary, those embodiments are provided for understanding the present disclosure more thoroughly, and communicating the range of the present disclosure to those skilled in the art completely.

Figure 1:
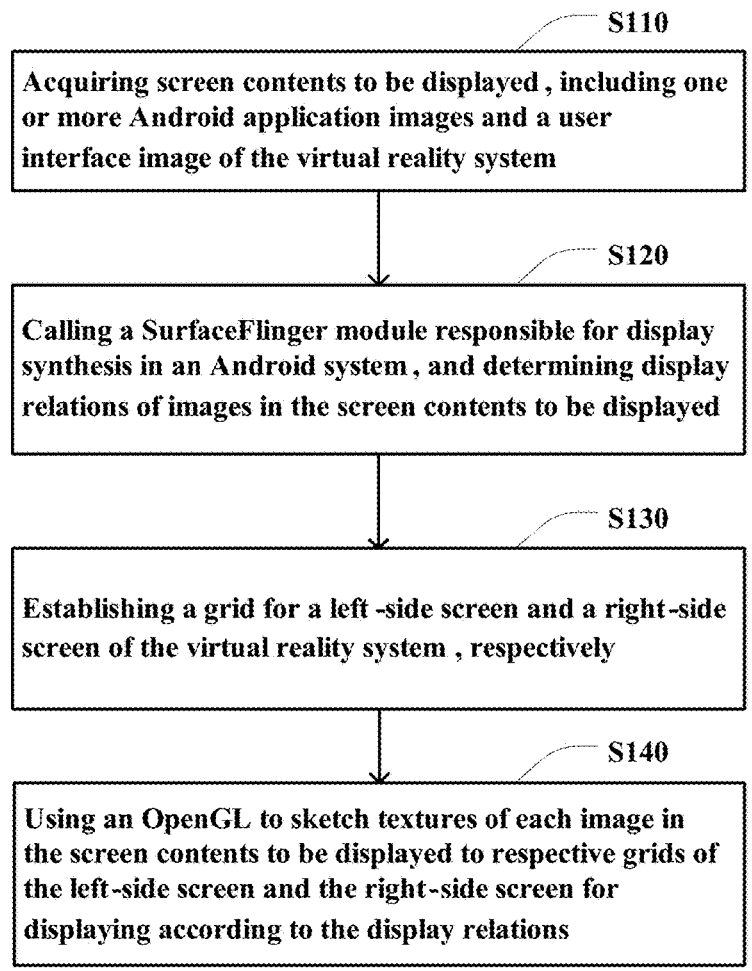
FIG. 1 illustrates a flow diagram of a method for displaying an Android application image in a virtual reality system according to an embodiment of the present invention.

FIG. 1 illustrates a flow diagram of a method for displaying an Android application image in a virtual reality system according to an embodiment of the present invention. As illustrated in FIG. 1, the method comprises:

Step S110: acquiring screen contents to be displayed, including one or more Android application images and a user interface image of the virtual reality system.

For example under a complex condition, the user wants to run application A while ensuring displaying on the user interface of the virtual reality system, e.g., displaying information such as battery level, time and signal strength on the upper portion of the screen. When application A is started, an accessorial advertisement application B is also run, wherein application B is displayed by only occupying a central portion of the screen. Thus, the screen contents to be displayed includes images of applications A and B, and a user interface image of the virtual reality system.

Step S120: calling a SurfaceFlinger module responsible for display synthesis in an Android system, and determining display relations of images in the screen contents to be displayed.

Descriptions are continued based on the above example. The user interface image of the virtual reality system needs to be displayed on the upper portion of the screen, and the image of application A shall be seamlessly displayed on the lower portion of the screen. Meanwhile, application B shall cover a part of the image of application A, i.e., the image of application A overlaps with the image of application B. Thus, this step needs to determine the display relations of the screen contents to be displayed similar to those in this example, such as superposition relations, splicing ways, display orientations and orders on the screen, etc.

Step S130: establishing a grid for a left-side screen and a right-side screen of the virtual reality system, respectively.

Step S140: using an Open Graphics Library (OpenGL) to sketch textures of each image in the screen contents to be displayed to respective grids of the left-side screen and the right-side screen for displaying according to the display relations.

Figure 2:
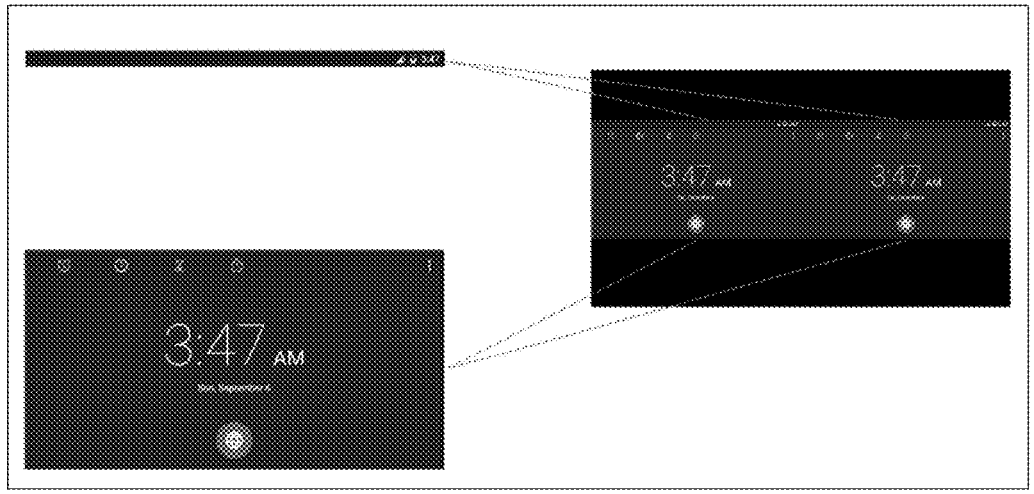
FIG. 2 illustrates a sketched diagram for displaying an Android application image in a virtual reality system according to a specific embodiment of the present invention.

FIG. 2 illustrates a sketched diagram for displaying an Android application image in a virtual reality system according to a specific embodiment of the present invention. In which, the left side includes textures of the screen contents to be displayed sketched according to the determined display relations by using the OpenGL in step S140. It can be seen that the textures include the texture of the user interface of the virtual reality system (the upper left part in FIG. 2) and the texture of the application image (the lower left part in FIG. 2). Finally, both the texture of the user interface of the virtual reality system and the texture of the application image are sketched to respective grids of the left-side screen and the right-side screen of the virtual reality system. In the Android system, when textures need to be sketched on the screen, a grid shall be established for the entire screen, e.g., the lower left coordinates are (−1, −1), the upper left coordinates are (1, 1), and the central coordinates are (0, 0). In consideration that the virtual reality system needs to utilize a screen to display for the left and right eyes, respectively, the screen is divided into a left-side screen and a right-side screen, and the images displayed thereon shall be independent from each other, thus the screen contents to be displayed needs to be zoomed. In the specific implementation, during the sketching of the left-side screen, the reference line at the right side of the grid of the screen may be moved to the central line of the screen to establish a new grid, thus the sketched image of the left-side screen is zoomed out and suitable to the left-side screen. The right-side screen can be sketched similarly, and the final effect is shown in FIG. 2. The scene where different contents shall be displayed on the left-side screen and the right-side screen can be satisfied by sketching the texture of the user interface of the virtual reality system and the texture of the application image respectively, rather than entirely.

It can be seen that the method as illustrated in FIG. 1 determines the display relations such as superposition orders and orientations of one or more Android application images and the user interface image of the virtual reality system, by calling a SurfaceFlinger module responsible for display synthesis in an Android system, and establishes a grid for a left-side screen and a right-side screen of the virtual reality system, respectively; next, it uses an OpenGL to sketch textures of each image in the screen contents to be displayed to respective grids of the left-side screen and the right-side screen of the virtual reality system for displaying. The technical solution solves the problem that an ordinary Android application having only one picture cannot be correctly displayed in the virtual reality system, and largely increases the number of Android applications usable in the virtual reality system. The cost is low, the method is simple, and the ecological environment of the virtual reality system is improved, thus the technical solution is suitable for practical purposes.

In one embodiment of the present invention, after acquiring the screen contents to be displayed, the method as illustrated in FIG. 1 further comprises: applying for corresponding layers for the one or more Android application images and the user interface image of the virtual reality system, respectively; and calling a SurfaceFlinger module responsible for display synthesis in an Android system, and determining display relations of the screen contents to be displayed comprises: determining display relations of the layers.

Specifically, in the Android system, the application shall be displayed on the screen, and processing the display relations of the images by software requires calling the SurfaceFlinger. Before that, a Client category shall be created, and then a layer is applied for from the SurfaceFlinger. In the Android system, the display relations of the screen contents may be determined by calling an Overlay by hardware, or calling the SurfaceFlinger by software, wherein the manner of hardware is simple but not suitable to implement technical solutions of the present invention, and the embodiment provides an implementation method for calling the SurfaceFlinger.

In one embodiment of the present invention, in the above method, using an OpenGL to sketch textures of each image in the screen contents to be displayed to respective grids of the left-side screen and the right-side screen for displaying according to the display relations comprises: merging the images in the screen contents to be displayed according to the determined display relations to sketch a complete image; and using the OpenGL to sketch textures of the complete image to the respective grids of the left-side screen and the right-side screen for displaying.

Figure 3:
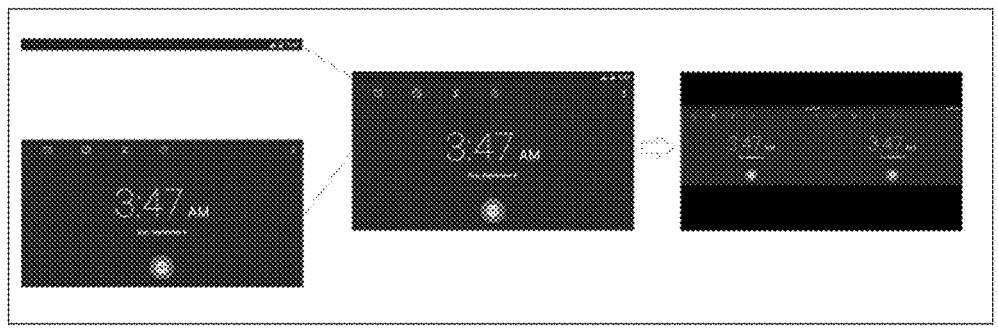
FIG. 3 illustrates another sketched diagram for displaying an Android application image in a virtual reality system according to a specific embodiment of the present invention.

FIG. 3 illustrates another sketched diagram for displaying an Android application image in a virtual reality system according to a specific embodiment of the present invention. As illustrated in FIG. 3, the most left represents using an OpenGL to sketch textures of the screen contents to be displayed according to determined display relations, wherein the textures include two parts, i.e., the texture of the user interface of the virtual reality system (the upper left portion in FIG. 3) and the texture of the application image (the lower left portion in FIG. 3). The middle of FIG. 3 represents merging the screen contents to be displayed (the user interface of the virtual reality system and the application image) according to determined display relations to sketch a complete texture. The most right of FIG. 3 represents an effect picture finally displayed on the screen. The method does not need to respectively sketch the texture of the user interface of the virtual reality system and the texture of the application image, thereby reducing the number of sketching and being suitable to the condition that the contents to be displayed on the left-side screen and the right-side screen are the same as each other.

Figure 4:
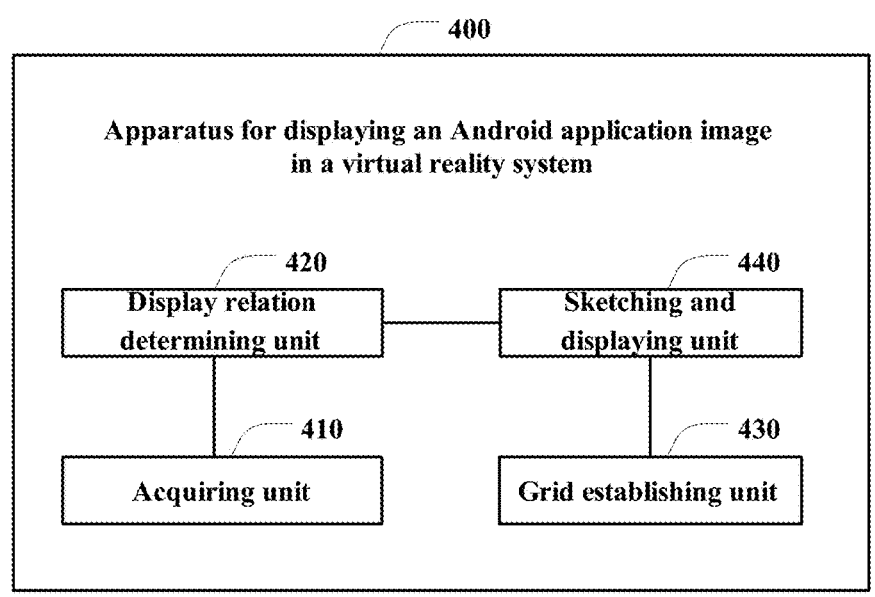
FIG. 4 illustrates a structure diagram of an apparatus for displaying an Android application image in a virtual reality system according to an embodiment of the present invention.

FIG. 4 illustrates a structure diagram of an apparatus for displaying an Android application image in a virtual reality system according to an embodiment of the present invention. As illustrated in FIG. 4, an apparatus 400 for displaying an Android application image in a virtual reality system comprises:

an acquiring unit 410 configured to acquire screen contents to be displayed, including one or more Android application images and a user interface image of the virtual reality system;

a display relation determining unit 420 configured to call a SurfaceFlinger module responsible for display synthesis in an Android system, and determine display relations of images in the screen contents to be displayed;

a grid establishing unit 430 configured to establish a grid for a left-side screen and a right-side screen of the virtual reality system, respectively; and a sketching and displaying unit 440 configured to use an OpenGL to sketch textures of each image in the screen contents to be displayed to respective grids of the left-side screen and the right-side screen for displaying according to the display relations.

It can be seen that the apparatus as illustrated in FIG. 4 determines the display relations such as superposition orders and orientations of one or more Android application images and the user interface image of the virtual reality system, by calling a SurfaceFlinger module responsible for display synthesis in an Android system, and establishes a grid for a left-side screen and a right-side screen of the virtual reality system, respectively; next, it uses an OpenGL to sketch textures of each image in the screen contents to be displayed to respective grids of the left-side screen and the right-side screen of the virtual reality system for displaying. The technical solution solves the problem that an ordinary Android application having only one picture cannot be correctly displayed in the virtual reality system, and largely increases the number of Android applications usable in the virtual reality system. The cost is low, the method is simple, and the ecological environment of the virtual reality system is improved, thus the technical solution is suitable for practical purposes.

In one embodiment of the present invention, the apparatus as illustrated in FIG. 4 further comprises a layer applying unit configured to apply for corresponding layers for the one or more Android application images and the user interface image of the virtual reality system, respectively; the display relation determining unit is further configured to determine display relations of the layers.

In one embodiment of the present invention, in the above apparatus, the sketching and displaying unit is specifically configured to merge the images in the screen contents to be displayed according to the determined display relations to sketch a complete image; and use the OpenGL to sketch textures of the complete image to the respective grids of the left-side screen and the right-side screen for displaying.

To be noted, the implementation ways of the apparatus are the same as those of the above corresponding method, and herein are omitted.

In one embodiment of the present invention, a virtual reality system is provided, comprising an apparatus for displaying an Android application image according to any one of the above embodiments, in which one or more Android applications are run.

In conclusion, the technical solutions of the present invention determine the display relations such as superposition orders and orientations of one or more Android application images and the user interface image of the virtual reality system, by calling a SurfaceFlinger module responsible for display synthesis in an Android system, apply for corresponding layers for one or more Android application images and the user interface image of the virtual reality system, respectively, and establish a grid for a left-side screen and a right-side screen of the virtual reality system, respectively; next, they use an OpenGL to sketch textures of each image in the screen contents to be displayed to respective grids of the left-side screen and the right-side screen of the virtual reality system for displaying, or firstly sketch a complete texture from all the screen contents to be displayed according to the determined display relations, and then sketch the complete texture to respective grids of the left-side screen and the right-side screen of the virtual reality system for displaying. The technical solutions solve the problem that an ordinary Android application having only one picture cannot be correctly displayed in the virtual reality system, and largely increase the number of Android applications usable in the virtual reality system. The cost is low, the method is simple, and the ecological environment of the virtual reality system is improved, thus the technical solutions are suitable for practical purposes.

The above descriptions are just preferred embodiments of the present invention, rather than restrictions to the protection scope of the present invention. Any amendment, equivalent replacement, improvement, etc. made within the spirit and principle of the present invention shall fall within the protection scope of the present invention.

To be noted:

The algorithms and displaying provided herein are not inherently related to any particular computer, virtual apparatus or other device. Various general apparatuses can also be used based on the teachings herein. The structures required for constructing those apparatuses are obvious from the above descriptions. In addition, the present invention is not proposed for any particular programming language. It shall be understood that the content of the present invention described herein can be implemented with various programming languages, and the above descriptions for the particular language are made to reveal the optimal embodiment of the present invention.

Although many details are described herein, it shall be appreciated that the embodiments of the present invention can be practiced without those details. Some examples do not illustrate the known method, structure or technology in details, so as not to obfuscate the comprehension of the Specification.

Similarly, it shall be appreciated that in order to simplify the present disclosure and promote the comprehension of one or more aspects of the present invention, the features of the present invention sometimes are grouped into a single embodiment, drawing or description thereof, in the above descriptions of the exemplary embodiments of the present invention. However, the method of the disclosure shall not be interpreted as reflecting such an intention that the claimed invention requires more features than each claim. To be more precise, as reflected by the following claims, each aspect of the invention has less features than a single embodiment disclosed previously. The claims in conformity with an implementation are thereby explicitly incorporated therein, wherein each claim is a single embodiment of the present invention.

It will be appreciated by those skilled in the art that modules in a device of an embodiment can be adaptively changed and disposed one or more devices different from the embodiment. Modules, units or components in an embodiment may be combined into one module, unit or component, or each of them may be divided into a plurality of sub-modules, sub-units or sub-components. Except that at least some of those features and/or processes or units are mutually exclusive, all features disclosed herein (including the accompanying claims, Abstract and drawings) and all processes or units of any method or apparatus thus disclosed can be combined in any way. Unless otherwise specified, each feature disclosed herein (including the accompanying claims, Abstract and drawings) may be replaced by a same, equivalent or similar substitutive feature.

In addition, it can be appreciated by those skilled in the art that although some embodiments described herein include certain features of other embodiment, rather than other features, any combination of features of different embodiments falls within the scope of the present invention and forms a different embodiment. For example, in the following claims, any one of the claimed embodiments may be used by being randomly combined.

The embodiments of various parts of the present invention may be implemented with hardware, software modules running on one or more processors, or combinations thereof. It shall be appreciated by those skilled in the art that some or all functions of some or all parts in a cloud checking and killing device for combating an anti-antivirus test according to an embodiment of the present invention may be realized with a microprocessor or a digital signal processor (DSP) in practice. The present invention may also be implemented as a device or apparatus program (e.g., computer program and computer program product) to execute the method described herein partially or entirely. Such a program for implementing the present invention may be stored in a computer readable program, or in form of one or more signals. Such signals may be downloaded from Internet websites, or provided by carrier signals or provided in any other way.

To be noted, the above embodiments are just descriptions of the present invention rather than limitations thereto. In addition, those skilled in the art can design a substitutive embodiment without deviating from the scope of the accompanying claims. In the claims, any reference sign in parentheses shall not be constructed as a limitation to the claims. The term "comprise/include" does not exclude any element or step not listed in the claims. The term "a/one" in front of an element does not exclude a situation that there are multiple such elements. The present invention can be implemented by hardware having several different elements, and a computer programmed appropriately. In a unit claim listing several devices, some of those devices may be specifically reflected by the same hardware item. The usage of the terms "first", "second" and "third" does not indicate any sequence. Those terms may be construed as names.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for displaying an Android application image in a virtual reality system, comprising:

acquiring screen contents to be displayed, including one or more Android application images and a user interface image of the virtual reality system;

calling a SurfaceFlinger module responsible for display synthesis in an Android system, and determining display relations of images in the screen contents to be displayed;

establishing a grid for a left-side screen and a right-side screen of the virtual reality system, respectively; and using an OpenGL to sketch textures of each image in the screen contents to be displayed to respective grids of the left-side screen and the right-side screen for displaying according to the display relations.

2. The method according to claim 1, wherein after acquiring the screen contents to be displayed, the method further comprises:

applying for corresponding layers for the one or more Android application images and the user interface image of the virtual reality system, respectively; and calling a SurfaceFlinger module responsible for display synthesis in an Android system, and determining display relations of the screen contents to be displayed comprises: determining display relations of the layers.

3. The method according to claim 2, wherein using an OpenGL to sketch textures of each image in the screen contents to be displayed to respective grids of the left-side screen and the right-side screen of the virtual reality system for displaying according to the display relations comprises:

merging the images in the screen contents to be displayed according to the determined display relations to sketch a complete image; and using the OpenGL to sketch textures of the complete image to the respective grids of the left-side screen and the right-side screen for displaying.

4. An apparatus for displaying an Android application image in a virtual reality system, comprising a processor, which is configured to:

acquire screen contents to be displayed, including one or more Android application images and a user interface image of the virtual reality system;

call a SurfaceFlinger module responsible for display synthesis in an Android system, and determine display relations of images in the screen contents to be displayed;

establish a grid for a left-side screen and a right-side screen of the virtual reality system, respectively; and use an OpenGL to sketch textures of each image in the screen contents to be displayed to respective grids of the left-side screen and the right-side screen for displaying according to the display relations.

5. The apparatus according to claim 4, wherein the processor is further configured to:

apply for corresponding layers for the one or more Android application images and the user interface image of the virtual reality system, respectively; and determine display relations of the layers.

6. The apparatus according to claim 5, wherein the processor is further configured to: merge the images in the screen contents to be displayed according to the determined display relations to sketch a complete image; and use the OpenGL to sketch textures of the complete image to the respective grids of the left-side screen and the right-side screen for displaying.

7. A virtual reality system, comprising an apparatus for displaying an Android application image according to claim 6, in which one or more Android applications are run.

* * * * *